United States Patent
Lacy

(10) Patent No.: US 11,423,882 B2
(45) Date of Patent: Aug. 23, 2022

(54) MULTI-PURPOSE PROTECTIVE FACE MASK

(71) Applicant: Eric Lacy, Calabasas, CA (US)

(72) Inventor: Eric Lacy, Calabasas, CA (US)

( * ) Notice: Subject to any disclaimer, the term of this patent is extended or adjusted under 35 U.S.C. 154(b) by 0 days.

(21) Appl. No.: 17/332,751

(22) Filed: May 27, 2021

(65) Prior Publication Data

US 2021/0375268 A1 Dec. 2, 2021

Related U.S. Application Data

(60) Provisional application No. 63/030,309, filed on May 27, 2020.

(51) Int. Cl.
| | |
|---|---|
| *G10L 15/08* | (2006.01) |
| *H04W 4/80* | (2018.01) |
| *H04R 1/02* | (2006.01) |
| *G06F 40/58* | (2020.01) |

(52) U.S. Cl.
CPC .............. *G10L 15/08* (2013.01); *G06F 40/58* (2020.01); *H04R 1/025* (2013.01); *H04W 4/80* (2018.02); *H04R 2420/07* (2013.01); *H04R 2430/01* (2013.01)

(58) Field of Classification Search
CPC .......... G10L 15/08; H04W 4/80; G06F 40/58; H04R 1/025; H04R 2420/07; H04R 2430/01
See application file for complete search history.

(56) References Cited

U.S. PATENT DOCUMENTS

| | | | |
|---|---|---|---|
| 2017/0080262 A1* | 3/2017 | Freres | H04R 1/028 |
| 2017/0368383 A1* | 12/2017 | Riccio | A61M 16/021 |
| 2018/0318613 A1* | 11/2018 | Thompson | A62B 18/08 |

* cited by examiner

*Primary Examiner* — Fan S Tsang
*Assistant Examiner* — David Siegel
(74) *Attorney, Agent, or Firm* — Michael D. Eisenberg

(57) ABSTRACT

A protective face mask implemented with a pocket located on a front surface of the mask. A removable amplifier unit configured to be placed into the pocket, the removable amplifier unit comprising: a micro-processor configured to process voice data; a rechargeable battery coupled to the micro-processor; a Bluetooth device coupled to the micro-processor; a microphone coupled to the micro-processor and configured to provide the voice data to the micro-processor; and a speaker unit configured to output the voice data processed by the micro-processor.

12 Claims, 7 Drawing Sheets

450

MULTI-PURPOSE PROTECTIVE FACE MASK

CROSS-REFERENCES TO RELATED APPLICATIONS

This application claims priority from U.S. Provisional Application Ser. No. 63/030,309 filed May 27, 2020, which is hereby incorporated herein by reference in its entirety.

TECHNICAL FIELD

This application generally relates to a face protection system, and more particularly, to a multi-purpose protective mask with sound processing capability.

BACKGROUND

Wide variety of face masks are currently used by millions of people all over the world due to viral pandemics. Typically, a user would put the mask on when entering any indoor area such as a supermarket or a store, on public transportation, on airplanes, in a classroom, etc. In other words, people wear face masks when surrounded by other people. While in these situations, people need to communicate, which is very difficult with the masks on. People also try to speak through the mask using a normal tone of voice to avoid producing potentially contagious liquid droplets. This makes hearing each other even more challenging given the fact that lip movements are hidden behind the mask. Yet pulling the mask down for speaking is not a good option as it defeats the purpose of using the mask around other people to begin with.

Accordingly, a multi-purpose face mask with sound amplification capability is desired.

SUMMARY

One example embodiment provides a protective face mask implemented with a pocket located on a front surface of the mask. A removable amplifier unit configured to be placed into the pocket, the removable amplifier unit comprising: a micro-processor configured to process voice data; a rechargeable battery coupled to the micro-processor; a Bluetooth device coupled to the micro-processor; a microphone coupled to the micro-processor and configured to provide the voice data to the micro-processor; and a speaker unit configured to output the voice data processed by the micro-processor.

Another example embodiment provides a method that includes one or more of placing a removable amplifier unit into a pocket located on a front surface of a protective face mask; and activating a micro-processor of the removable amplifier unit to: receive voice data from a microphone operatively couple to the micro-processor; acquire data processing settings from an external device; process the voice data based on the settings; and output the processed voice data to a voice reproducing unit.

BRIEF DESCRIPTION OF THE DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Accordingly, the exemplary embodiments provide for a specific solution to a problem in the arts/field of ant-virus face protection equipment.

Example embodiments provide methods, systems, components, non-transitory computer readable media, devices, and/or networks, which provide for implementation of a multi-use mask equipped with voice amplification along with other additional functionalities.

Figure 1:
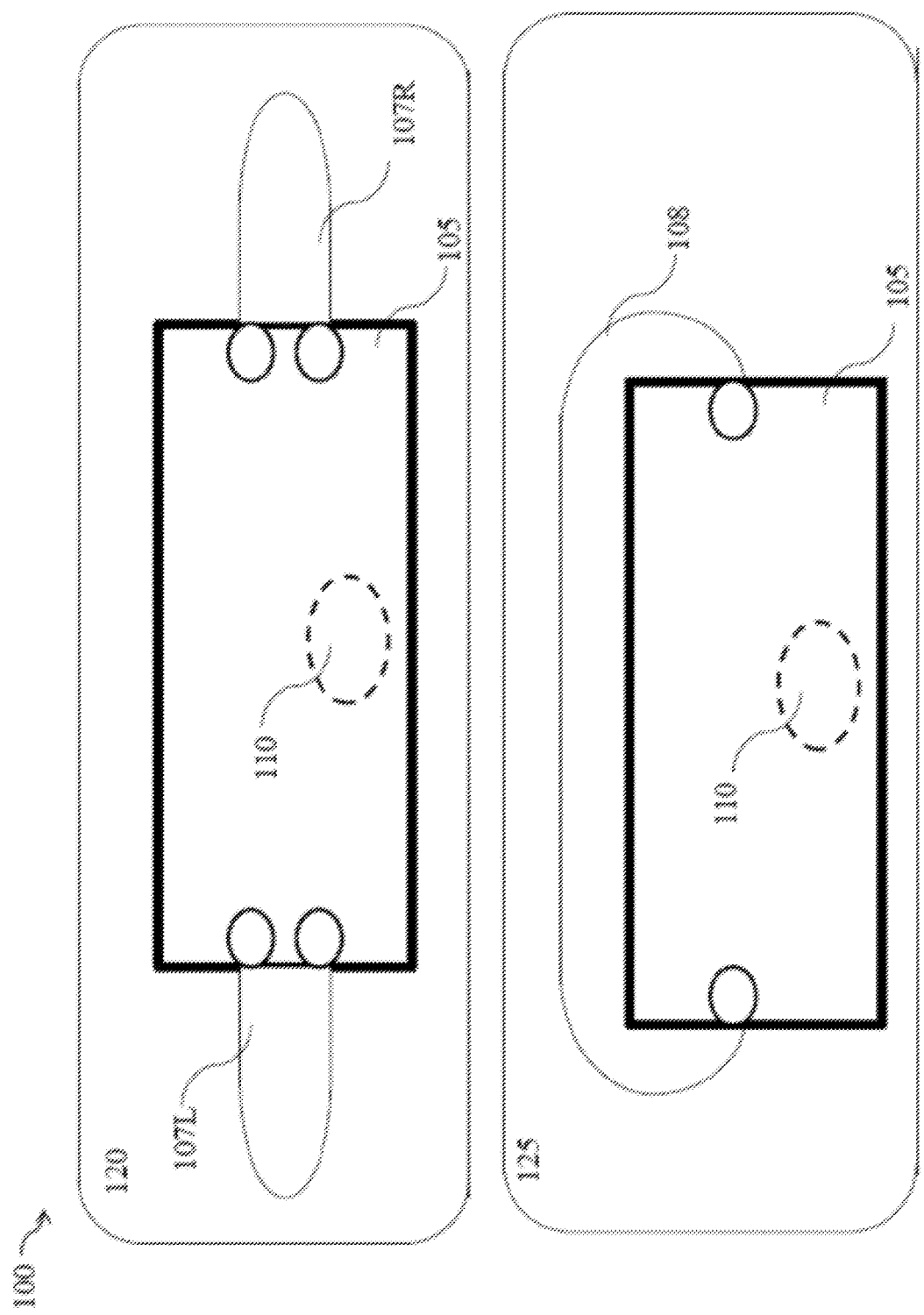
FIG. 1 is an illustration of the masks with a removable voice amplifier (AMP), in accordance with an embodiment of the present invention.

FIG. 1 illustrates exemplary face masks with a removable voice amplifier (AMP), in accordance with an embodiment of the present invention. Referring to FIG. 1, mask 120 and mask 125 are AMP-equipped masks composed of: (i) cloth-like material, which is comfortable to the user of mask 120 and mask 125; and (ii) a filter partially or completely covered by the cloth-like material, which protects the user of the mask 120 and the mask 125 from airborne pathogens, COVID-19 (or another virus) aerosol particles, and particulates.

The exemplary mask 120 or mask 125 have: (i) protective unit 105; and (ii) a connection strap. The masks 120 and mask 125 may be available in different specifications (e.g., small, medium, and large sizes to fit different users). A protective unit 105 contains a pocket 110 configured to store a voice AMP unit. Note that the pocket 110 can be of any shape suitable for accommodating voice AMP units of different shape. The pocket 110 may have inner padding for protection of the sound amplifying unit. The pocket 110 may have an outer movable flap.

When the outer movable flap covers the sound AMP unit (i.e., a non-exposed state) contained within pocket 110, the movable flap can be slid in an upwards direction such that the sound amplifying unit is placed into an exposed state. A mask user can press against the padding to release the sound AMP unit from pocket 110. When the movable flap is above the sound amplifying unit contained within pocket 110, the movable flap can be slid in a downwards direction such that the sound AMP unit is placed into a non-exposed state. The user can press against the sound amplifying unit contained within the pocket 110 to secure the sound amplifying unit within the pocket 110. The masks 120 and 125 with the pocket 110 may be washable or disposable. The sound AMP unit may be, advantageously, removed from the pocket 110 and may be used with other masks of the same design as the masks 120 and 125.

As discussed above, the sound AMP unit in pocket 110 is releasable and securable. Stated another way, the sound amplifying unit is removable with respect to pocket 110. The sound AMP unit may be covered by a water resistant housing. The AMP unit may amplify user voice to be transmitted outwards to others in proximity to the user. The water resistant housing may allow the sound AMP unit to be cleaned and disinfected to ensure the sterilization and safely for repeated use. The transmitted user voice sound is amplified such that the sounds coming from the user are not muffled by the mask.

The difference between the mask 120 and the mask 125 is the connection strap. In the mask 120, the connection strap is implemented as loops 107L and 107R, which can be placed behind the left ear and right ear of the user, respectively. In the mask 125, the connect strap is implemented as a single loop 108, which can be placed behind the head of the user. The connection strap is adjustable such that the loops 107L and 107R make a supple fit over the ears and snuggly places the protective unit 105 over the mouth, nose, cheeks, and chin. The connection strap is adjustable as well such that the loop 108 makes a supple fit over the ears and snuggly places the protective unit 105 over the mouth, nose, cheeks, and chin. The connection strap may be made of rubber, cloth, polyester, or other suitable material. The left and right sides of the protective unit 105 each contain two points of interaction in the mask 120, whereas the left and right sides of the protective unit 105 contain a single point of interaction in the mask 125.

Figure 2:
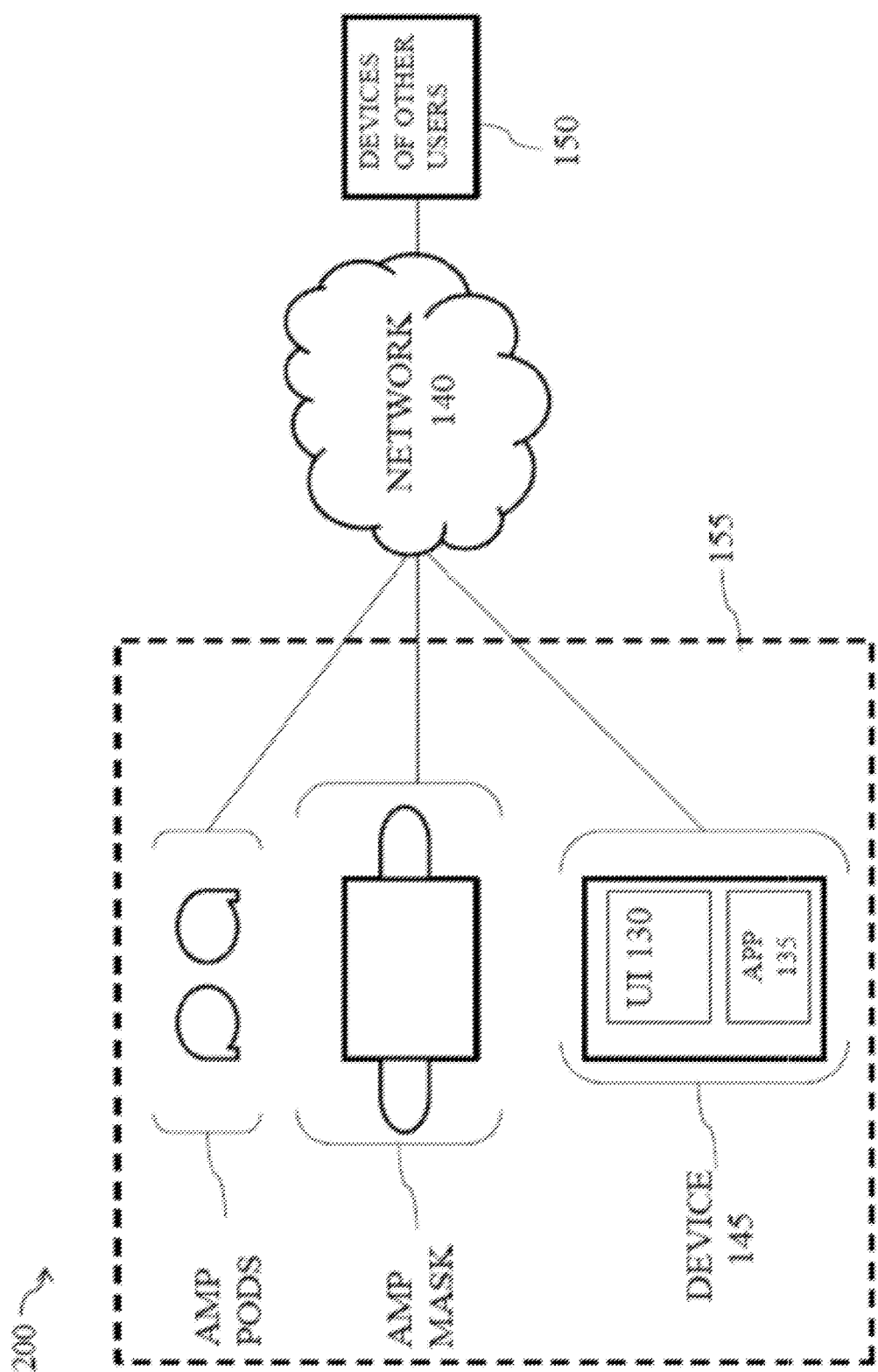
FIG. 2 is an illustration of an environment for use of the masks with a removable voice AMP, in accordance with an embodiment of the present invention.

Referring to FIG. 2, the AMP pods, the AMP mask, and device 145 are connected to each other via network 140. Network 100 is a digital telecommunications network (e.g., Local Administrative Network or WiFi) for sharing resources between nodes—AMP pods, AMP mask, device 145, and miscellaneous devices 150. AMP setup 155 protects the user from pathogens while facilitating clearer inbound and outbound communication for the user (i.e., receiving and sending sounds) via the following devices: AMP pods, AMP mask, and device 145. AMP pods are placed in the ears of the user, wherein the user places the AMP mask over his or her mouth and uses device 145.

Additionally, volumes of the transmitted sound can be controlled by the AMP module. The AMP module has functionalities to: (i) pick up voices of other people; (ii) transmit to any Bluetooth device, such as AMP airpods (in FIG. 2); and (iii) connect to the AMP application, i.e., application 135 on the user device in FIG. 2.

Device 145 may be a personal computer (PC), mobile device, smartphone, tablet, or programmable device that has an application 135 (the AMP application) for displaying webpage content on user interface (UI) 130 communicates with other devices (e.g., AMP pods, AMP masks, and miscellaneous devices 150) via network 140. Miscellaneous devices 150 may be: (A) devices in use by the user besides the devices in AMP Setup 155; or (B) devices in use by other people.

The application 135 is computer program residing on the device 145, which connects to AMP mask and AMP pods. Within AMP mask, the AMP module of sound amplifying unit may be in communication with application 135 and AMP pods, thereby enhancing communication and voice amplification of the AMP mask within AMP Setup 155. The volume of the sounds sent through the AMP mask and received through AMP pods is controlled by the application 135. Within the application 135, a Bluetooth module can locate other Bluetooth devices within miscellaneous devices 150 and AMP pods of AMP setup 155. Within the application 135, the user can enter in: (i) languages and (ii) permissions—merchant, consumer, emergency, etc.

For example, if the user is a clerk at a store, then the user enters merchant as the permission. If the user is a customer at a store or at a hospital, then the user enters consumer as the permission. If the user sees or experiencing a situation impacting his or her own safety or someone else's safety, then the user may enter emergency as the permission.

Additionally, application 135 can: (i) implement particular responses, based on certain situations and permissions; (ii) modify voices; and (iii) translate languages; and (iv) scan the user's temperature. The situations are determined by the application 135, based on geo-sensors. The geo-sensors may detect the exact location, thereby allowing the application 135 to determine a precise setting of the user. The response may be generated based on the precise setting. The response may be pre-configured to be relevant to the situations. For example, items at a grocery store may have a pre-configured response of the price of the item and the expiration date.

For example, amplifications of sounds received by the user may be increased for a user in a grocery store, library, or other public settings. If the application 135 determines there is an emergency situation, such as a person next to the user suddenly fainting, the amplification of the sounds transmitted by the user may be increased so the user can loudly transmit that the person next to the user has suddenly fainted.

In one example, automated responses may be generated at stores where the user is a clerk in a store. The application 135 may determine the user is in the store based on the detected location. The user enters merchant as the permission into application 135 which may be used in part for the automated responses pertaining to items being sold. Device 145 can be placed towards the item being sold or an item of interest to a customer. The scan code of the item is processed by application 135. Based on the store location, merchant permission of the user, the scan code of the item (e.g., milk), the price and expiration date are communicated to the customer through the sound amplification unit of the AMP mask.

In one example embodiment, translations of languages from the user to others in public settings, such as hospitals, police, and businesses can be generated and transmitted through the sound amplification unit of the AMP mask. A user may select emergency as the permission and Spanish as language. For example, a user speaks English and is visiting Spain. Unfortunately, there is an emergency situation where another person requires police help and the user is unable to communicate this clearly in Spanish. The user sees police officers nearby and speaks into the sound amplification unit of the AMP mask in English stating that "Someone has been seriously injured." The received English audio is processed by application 135 and translated into Spanish. The translated Spanish voice data from the application 135 is sent to the sound amplification unit of the AMP mask. The translated Spanish phrase sent through the sound amplification unit of the AMP mask may be audible to the nearby police officers.

The application 135 can also be used for entertainment purposes. The application 135 has a voice modifying option including animal sounds, cartoon characters, famous actors and other types of tones and voices that can be selected. Thereby, these selections are transmitted through the sound amplification unit of the AMP mask. Application 135 can be linked to the music library which can be transmitted to the AMP pods or AMP mask.

The AMP pods can be contained within a light weight shell. The light weight shell may also contain other components. The AMP pods for each user have: (i) audio speaker to receive, send, and project sounds; (ii) microphone; (iii) Bluetooth receptor; (iv) USB charging capability; and (v) ON/OFF switch. The AMP pods are waterproof such the AMP pods can be properly disinfected, withstand sweat, and be used multiple times. A thermometer can be used with the application 135 and AMP pods to scan the temperature of the user when the application 135 and AMP pods are connected to each other.

Figure 3:
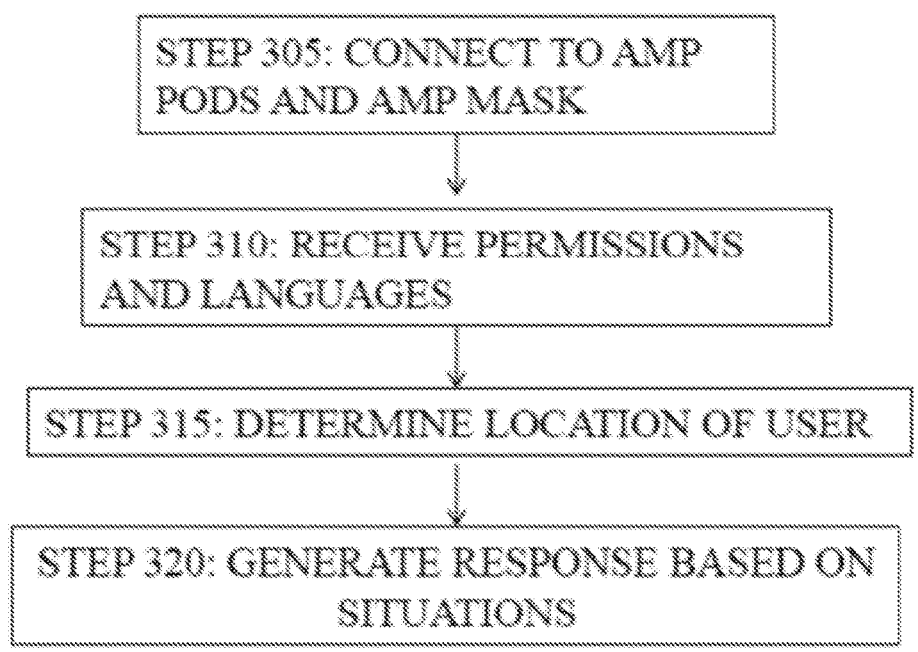
FIG. 3 a flowchart for implementing the masks with a removable voice AMP, in accordance with an embodiment of the present invention.

Referring to FIG. 3, the steps of the flowchart are performed by the application 135. In step 305, application 135 connects to AMP pods and AMP mask of the user to form AMP setup 145. In step 310, the application 135 receives, and thereby processes, permissions and languages, as described above. In step 315, application 135 determines the location of the user wearing the AMP pods and AMP mask, based on GPS or other determined coordinates, as described above. In step 320, the application 135 generates a response based on situations. The situations are based on at least the permissions, languages, location, and other factors, as described above.

Figure 4:
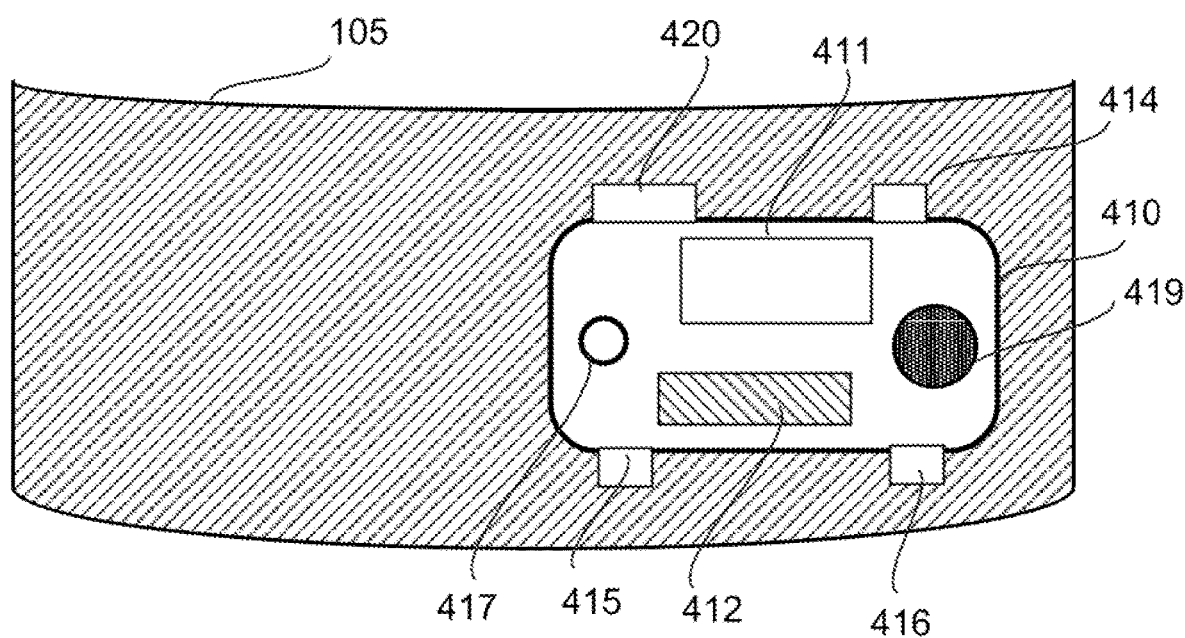
FIG. 4 illustrates a mask with a removable micro-processor and other elements, in accordance with an embodiment of the present invention.

FIG. 4 illustrates a mask with a removable micro-processor and other elements, in accordance with an embodiment of the present invention.

Referring to FIG. 4, a multi-purpose face mask 105 may include a removable amplifier unit 410 controlled by a micro-processor 411 with embedded firmware. The amplifier unit 410 may be powered by a rechargeable battery 412. In one embodiment, the battery 412 may be charged via USB connection. The amplifier unit 410 may have a mute button 415 as well as an up-volume button 414 and a down-volume button 416. The exemplary amplifier unit 410 may have a microphone 417 and a speaker 419. The amplifier unit 410 may have an integrated Bluetooth device 420. As discussed above, the AMP pods (not shown) may be wirelessly connected to the amplifier unit 410. The Bluetooth device 420 may be configured to communicate with other users wearing the masks 105 equipped with the removable amplifier unit 410. Mask to mask communication will be discussed in more details below.

Figure 5A:
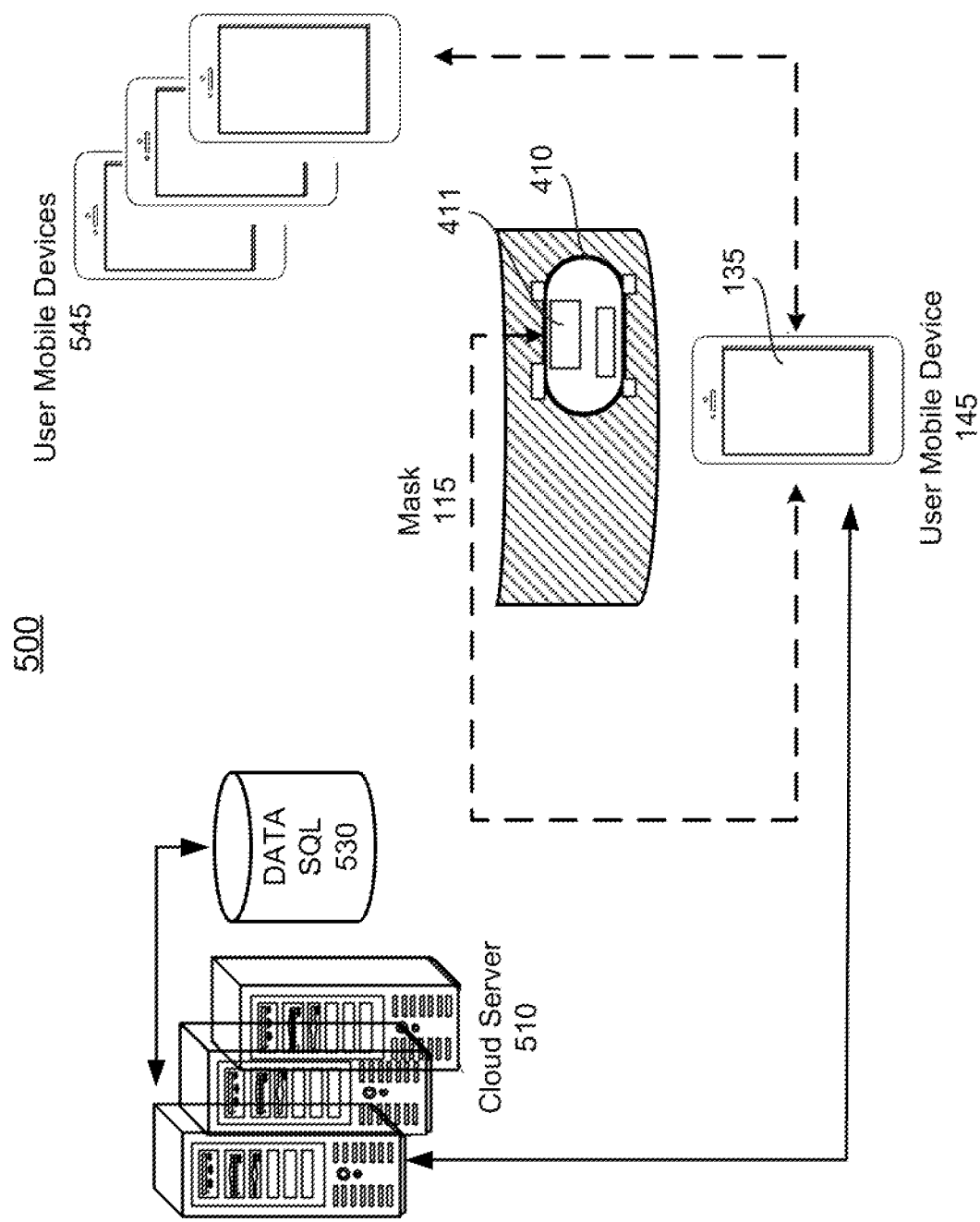
FIG. 5A illustrates a network for using the mask, in accordance with an embodiment of the present invention.

FIG. 5A illustrates a network for using the mask, in accordance with an embodiment of the present invention.

Referring to FIG. 5A, the mask 115 with the removable amplifier unit 410 may be connected to a user mobile device 145. The microprocessor 411 of the amplifier unit 410 may be wirelessly connected to the user mobile device 145. In one embodiment, a user of the mask 115 may enter desired setting for the amplifier unit 410 via mobile application running on the user mobile device 145. As discussed above, setting the amplifier unit 410 from the user mobile device 145, advantageously, protects the user from pathogens while facilitating clearer inbound and outbound communication for the user (i.e., receiving and sending sounds) via the amplifier unit 410. The volume of the sounds sent through the mask 115 and received through airpods may be controlled by the application 135 running on the user mobile device 145.

Additionally, volumes of the transmitted sound can be controlled or adjusted by the buttons of the amplifier unit 410 depicted in FIG. 4. As discussed above, the amplifier unit 410 may pick up and amplify voices of other people speaking, for example, through their masks. The amplifier unit 410 may transmit the amplified sounds to the Bluetooth device, such as the airpods (see FIG. 2). The amplifier unit 410 may provide the amplified sounds to the user mobile device 145 for processing. Some of the voice data may be processed on the user mobile device 145 and some computation intensive processing may be performed by a cloud server 510 connected to the user mobile device 145. In one embodiment, the microprocessor 411 may be directly connected to the cloud server 510 for data processing. As discussed above, the application 135 running on the modify user mobile device 145 may perform voice manipulations and real-time translation of user voice into selected language(s). These operations may be off-loaded to the cloud server 510 capable of robust processing of voice data using a searchable language database 530.

According to one embodiment, the user of the mask 115 may set connections and connection-related permissions to other mobile devices 545 connected to the masks 115 using the application 135. This way a user, such as an instructor or a classroom teacher, may set permissions to connect his mask 115 other remote users or the students in the classroom who are wearing the same masks and running the application 135 on their mobile devices. The teacher may speak into his or her mask 115 in a very low voice, but the students would receive a clear amplified voice into their airpods connected to their masks 115.

Figure 5B:
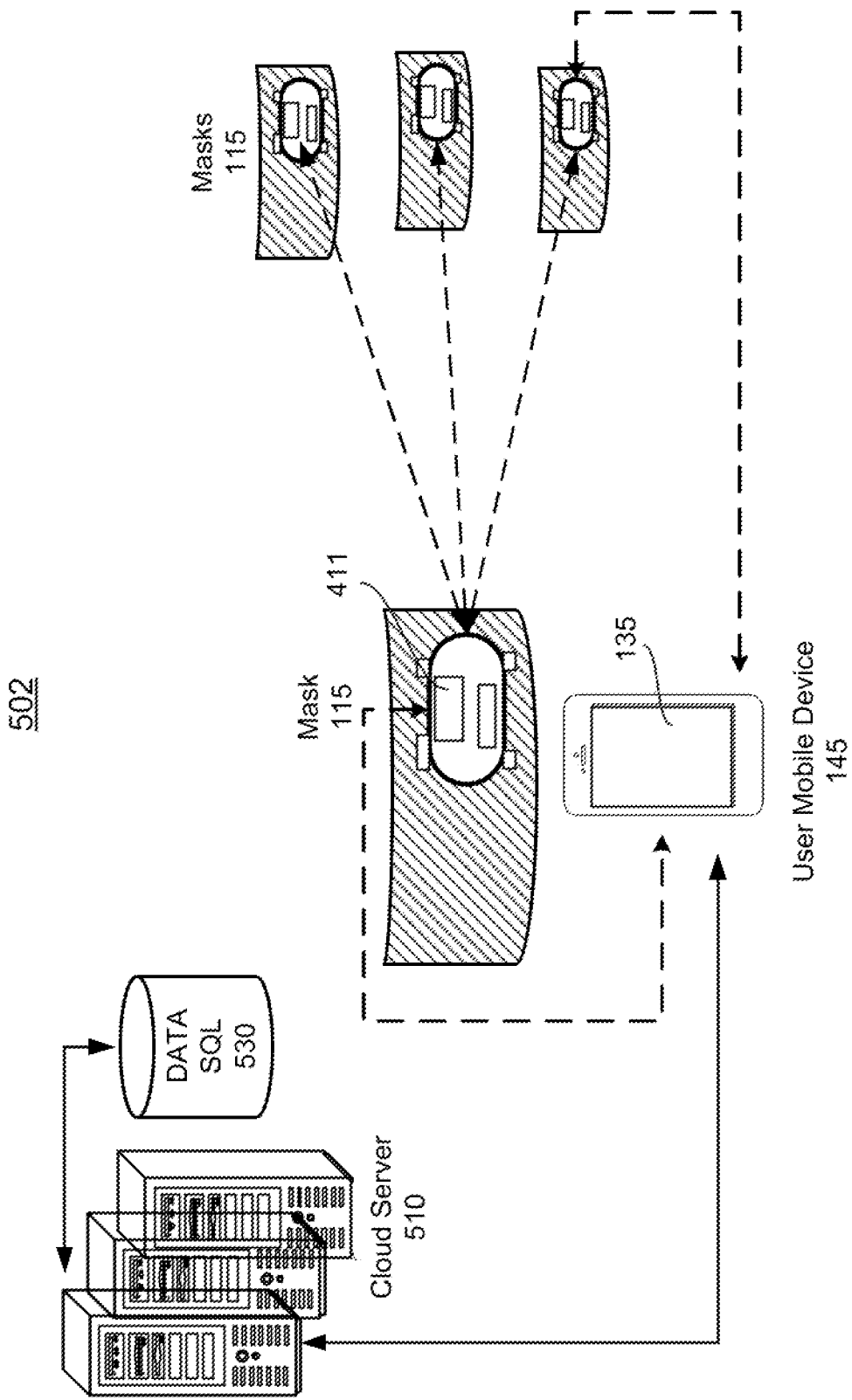
FIG. 5B illustrates a network for using the mask for direct mask to mask communications, in accordance with an embodiment of the present invention.

FIG. 5B illustrates a network for using the mask for direct mask to mask communications, in accordance with an embodiment of the present invention.

Referring to FIG. 5B, the mask 115 with the removable amplifier unit 410 may be connected to a user mobile device 145. As discussed above, the microprocessor 411 of the amplifier unit 410 may be wirelessly connected to the user mobile device 145. In one embodiment, a user of the mask 115 may enter desired setting for the amplifier unit 410 via a mobile application 135 running on the user mobile device 145. In one embodiment, the mobile application 135 may be configured to connect to other masks 115. This way, in case of teacher connecting to students, the teacher can set the volume, languages, type of voice, etc. from his/her mobile device 145 for the masks 115 of the students. Accordingly, the volume of the sounds sent through the mask 115 and received through airpods of the other connected masks 115 may be controlled by the application 135 running on the user mobile device 145.

As discussed above, the amplifier unit 410 may pick up and amplify voices of other people speaking, for example, through their masks. The amplifier unit 410 may transmit the amplified sounds to the Bluetooth device, such as the airpods (see FIG. 2). In one embodiment, a direct mask to mask communication may be implemented using the Bluetooth devices integrated in the masks 115. Accordingly, the mask 115 may detect other masks 115 within a communication range and may facilitate exchange of the voice data over the Bluetooth connection. This way, the users of the masks 115 may communicate secretly without other people around them hearing their communications. As discussed above, some computation intensive processing may be performed by a cloud server 510 connected to the user mobile device 145. In one embodiment, the microprocessor 411 may be directly connected to the cloud server 510 for data processing. As discussed above, the application 135 running on the modify user mobile device 145 may perform voice manipulations and real-time translation of user voice into selected language(s). These operations may be off-loaded to the cloud server 510 capable of robust processing of voice data using a searchable language database 530. However, the translated voice data may be routed directly to multiple users wearing masks 115 over the single user mobile device 145.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system/server node 500, which may represent or be integrated in any of the above-described components, etc.

Figure 6:
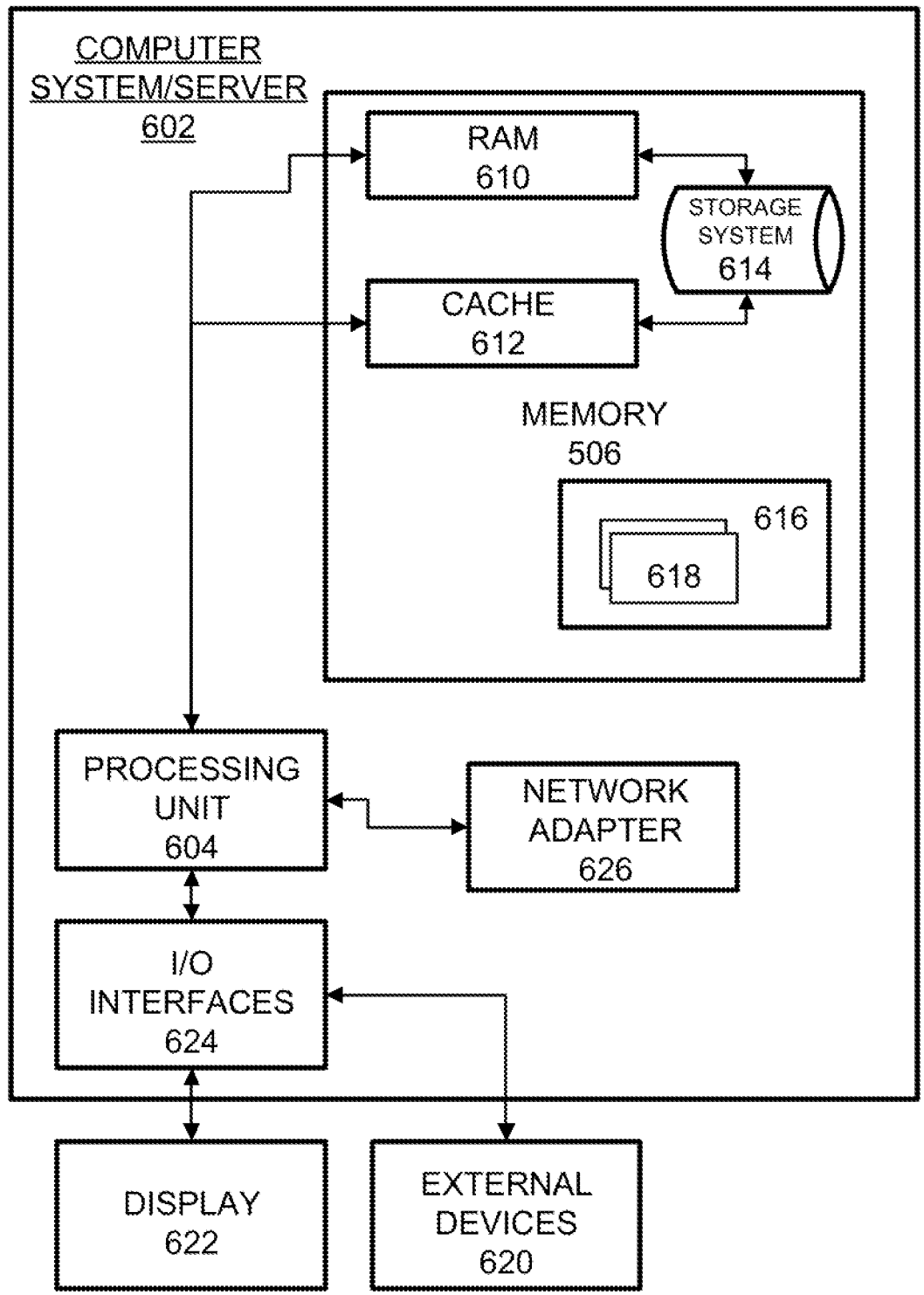
FIG. 6 illustrates an example server system that supports one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In the computing node 600 there is a computer system/server 602, which is operational with numerous other general purposes or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 may be used in cloud computing node 600 shown in the form of a general-purpose computing device. The components of the computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The exemplary computer system/server 602 typically includes a variety of computer system readable media. Such media may be any available media that is accessible by the computer system/server 602, and it includes both volatile and non-volatile media, removable and non-removable media. System memory 606, in one embodiment, implements the flow diagrams of the other figures. The system memory 506 can include computer system readable media in the form of volatile memory, such as random-access memory (RAM) 610 and/or cache memory 612. The computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

The computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, the computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, recipient or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a Smart phone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms, etc.) thereto.

What is claimed is:

1. A multi-purpose protective mask, comprising:
a pocket located on a front surface of the mask;
a removable amplifier unit configured to be placed into the pocket, the removable amplifier unit comprising:
a micro-processor configured to process voice data;
a rechargeable battery coupled to the micro-processor;
a short-range wireless device coupled to the micro-processor;
a microphone coupled to the micro-processor and configured to provide the voice data to the micro-processor; and
a speaker unit configured to output the voice data processed by the micro-processor;
wherein the micro-processor is configured to:
provide the processed voice data to a mobile device for modification;
receive modified voice data; and
output the modified voice data to the speaker unit.

2. The multi-purpose protective mask of claim 1, wherein the removable amplifier unit further comprising at least one volume adjustment button and at least one mute button.

3. The multi-purpose protective mask of claim 1, wherein the micro-processor is configured to execute instructions to amplify the voice data received from the microphone.

4. The multi-purpose protective mask of claim 3, wherein the micro-processor is configured to connect to a mobile device to receive volume settings for the amplification of the voice data.

5. The multi-purpose protective mask of claim 1, wherein the short-range wireless device is a Bluetooth device and wherein the micro-processor is configured to provide the processed voice data to a remote voice reproducing device using the integrated Bluetooth device.

6. The multi-purpose protective mask of claim 1, wherein the micro-processor is configured to provide the processed voice data to at least one other remote multi-purpose protective mask using the short-range wireless device.

7. The multi-purpose protective mask of claim 1, wherein the modified voice data comprises any of a translation into a specified language, a voice in specified tone, and a voice of a specified person.

8. A multi-purpose protective mask, comprising:
a pocket located on a front surface of the mask;
a removable amplifier unit configured to be placed into the pocket, the removable amplifier unit comprising:
a micro-processor configured to process voice data;
a rechargeable battery coupled to the micro-processor;
a short-range wireless device coupled to the micro-processor;
a microphone coupled to the micro-processor and configured to provide the voice data to the micro-processor; and
a speaker unit configured to output the voice data processed by the micro-processor;
wherein the micro-processor is configured to receive permission data from a mobile device to provide the processed voice data to at least one other removable amplifier unit located on another mask based on the permission data.

9. A method, comprising:
placing a removable amplifier unit into a pocket located on a front surface of a protective face mask; and
activating a micro-processor of the removable amplifier unit to:
receive voice data from a microphone operatively coupled to the micro-processor;
acquire data processing settings from an external device;
process the voice data based on the data processing settings;
output the processed voice data to a voice reproducing unit; and
providing, by the micro-processor, the processed voice data to a mobile device for modification;
receiving the modified voice data by the micro-processor; and
outputting, by the micro-processor, the modified voice data to a speaker unit connected to the micro-processor.

10. The method of claim 9, further comprising connecting, by the micro-processor, to the mobile device running an application configured to provide the data processing settings.

11. The method of claim 9, further comprising receiving, by the micro-processor, permission data from the mobile device to provide the processed voice data to at least one other micro-processor located on another mask based on the permission data.

12. The method of claim 9, further comprising providing, by the micro-processor, the processed voice data to at least one other remote multi-purpose protective mask using an integrated Bluetooth device connected to the micro-processor.

* * * * *